United States Patent [19]
Case

[11] Patent Number: 5,864,820
[45] Date of Patent: Jan. 26, 1999

[54] METHOD, SYSTEM AND PRODUCT FOR MIXING OF ENCODED AUDIO SIGNALS

[75] Inventor: Eliot M. Case, Denver, Colo.

[73] Assignees: U S West, Inc., Denver; MediaOne Group, Inc., Englewood, both of Colo.

[21] Appl. No.: 777,724

[22] Filed: Dec. 20, 1996

[51] Int. Cl.$^6$ ............................................. G10L 3/02
[52] U.S. Cl. ................................ 704/278; 704/500
[58] Field of Search ..................... 704/208, 278, 704/233, 500, 501, 503, 504; 381/62, 119, 118

[56] References Cited

U.S. PATENT DOCUMENTS

| | | |
|---|---|---|
| 4,061,875 | 12/1977 | Freifeld et al. . |
| 4,099,035 | 7/1978 | Yanick . |
| 4,118,604 | 10/1978 | Yanick . |
| 4,156,116 | 5/1979 | Yanick . |
| 4,509,186 | 4/1985 | Omura et al. . |
| 4,536,886 | 8/1985 | Papamichalis et al. . |
| 4,703,480 | 10/1987 | Westall et al. . |
| 4,813,076 | 3/1989 | Miller . |
| 4,820,059 | 4/1989 | Miller et al. . |
| 4,969,192 | 11/1990 | Chen et al. . |
| 4,975,958 | 12/1990 | Hanada et al. . |
| 4,993,073 | 2/1991 | Sparkes ...................................... 381/119 |
| 5,033,090 | 7/1991 | Weinrich . |
| 5,040,217 | 8/1991 | Brandenburg et al. . |
| 5,140,638 | 8/1992 | Moulsley et al. . |
| 5,199,076 | 3/1993 | Taniguchi et al. . |
| 5,201,006 | 4/1993 | Weinrich . |
| 5,226,085 | 7/1993 | Di Francesco . |
| 5,227,788 | 7/1993 | Johnston et al. . |
| 5,228,093 | 7/1993 | Agnello ...................................... 381/119 |
| 5,233,660 | 8/1993 | Chen . |
| 5,235,669 | 8/1993 | Ordentlich et al. . |
| 5,255,343 | 10/1993 | Su . |
| 5,285,498 | 2/1994 | Johnston . |
| 5,293,449 | 3/1994 | Tzeng . |
| 5,293,633 | 3/1994 | Robbins . |
| 5,301,019 | 4/1994 | Citta . |
| 5,301,205 | 4/1994 | Tsutsui et al. . |
| 5,329,613 | 7/1994 | Brase et al. . |

(List continued on next page.)

FOREIGN PATENT DOCUMENTS

| | | |
|---|---|---|
| 0446037A2 | 9/1991 | European Pat. Off. . |
| 0446037A3 | 9/1991 | European Pat. Off. . |
| 0607989A2 | 7/1994 | European Pat. Off. . |
| 0607989A3 | 7/1994 | European Pat. Off. . |
| WO91/06945 | 5/1991 | WIPO . |
| WO 94/25959 | 11/1994 | WIPO . |

OTHER PUBLICATIONS

New Digital Hearing Aids Perk Up Investors' Ears, St. Louis Post–Dispatch, Sep. 27, 1995.

Jean–Pierre Renard, Ph.D., B.B.A., High Fidelity Audio Coding, pp. 87–97.

Radatz, The IEEE Standard Dictonary of Electrical and Electronics Terms, 1996.

Broadhead et al. "Direct Manipulation of MPEG Compressed Digital Audio" ACM Multimedia 95, Sep. 9, 1995.

Primary Examiner—David R. Hudspeth
Assistant Examiner—Harold A. Zintel
Attorney, Agent, or Firm—Brooks & Kushman

[57] ABSTRACT

A method, system and product are provided for mixing of encoded audio signals. The method includes receiving a first encoded audio signal, the first signal having a plurality of frequency subbands, each subband having an audio level, and receiving a second encoded audio signal, the second signal having a plurality of frequency subbands, each subband having an audio level. The method also includes mixing the first and second signals to create a mixed encoded audio signal having a plurality of frequency subbands, each subband having an audio level based on a masking effect relationship between the audio levels and sample data of corresponding subbands of the first and second signals. The system includes control logic for performing the method. The product includes a storage medium having computer readable programmed instructions recorded thereon for performing the method.

15 Claims, 2 Drawing Sheets

FIRST ENCODED AUDIO SIGNAL

SECOND ENCODED AUDIO SIGNAL

MIXED ENCODED AUDIO SIGNAL

U.S. PATENT DOCUMENTS

| | | |
|---|---|---|
| 5,341,457 | 8/1994 | Hall, II et al. . |
| 5,353,375 | 10/1994 | Goto et al. . |
| 5,404,377 | 4/1995 | Moses . |
| 5,467,139 | 11/1995 | Lankford . |
| 5,473,631 | 12/1995 | Moses . |
| 5,488,665 | 1/1996 | Johnston et al. . |
| 5,500,673 | 3/1996 | Zhou . |
| 5,509,017 | 4/1996 | Brandenburg et al. . |
| 5,511,093 | 4/1996 | Edler et al. . |
| 5,512,939 | 4/1996 | Zhou . |
| 5,515,395 | 5/1996 | Tsutsui . |

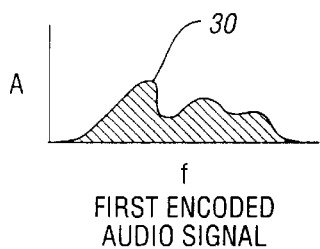
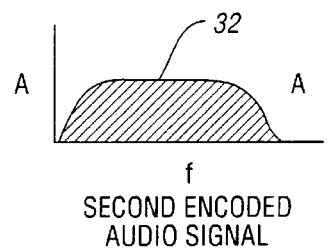
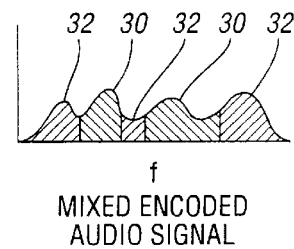
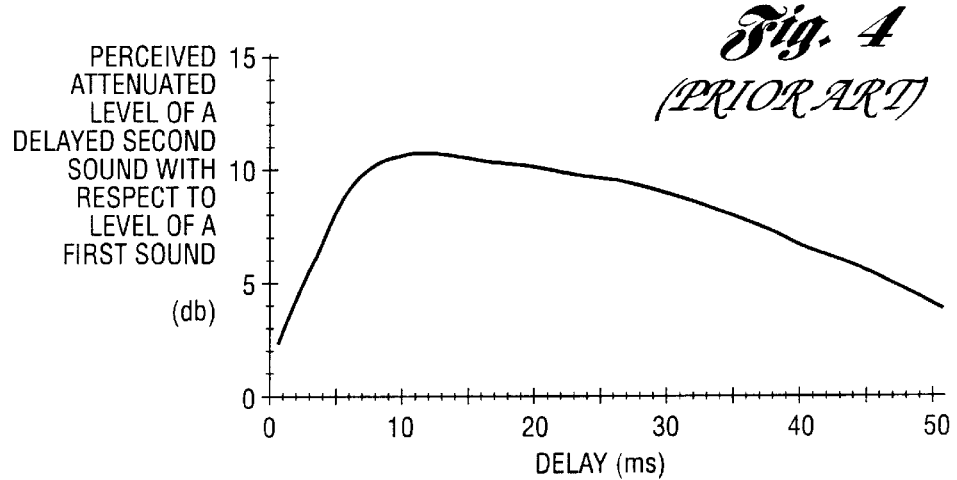
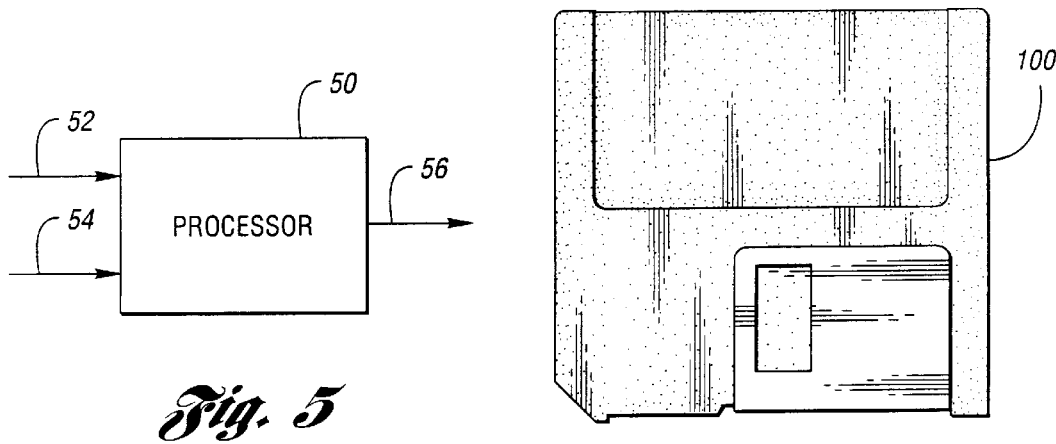
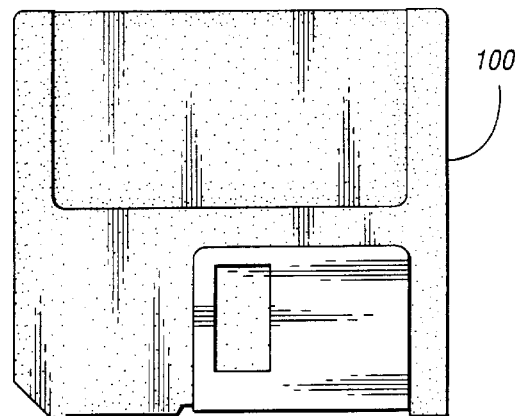

METHOD, SYSTEM AND PRODUCT FOR MIXING OF ENCODED AUDIO SIGNALS

CROSS-REFERENCE TO RELATED APPLICATIONS

This application is related to U.S. patent application Ser. Nos. 08/771,790 entitled "Method, System And Product For Lossless Encoding Of Digital Audio Data"; 08/771,462 entitled "Method, System And Product For Modifying The Dynamic Range Of Encoded Audio Signals"; 08/771,792 entitled "Method, System And Product For Modifying Transmission And Playback Of Encoded Audio Data"; 08/771,512 entitled "Method, System And Product For Harmonic Enhancement Of Encoded Audio Signals"; 08/769,911 entitled "Method, System And Product For Multiband Compression Of Encoded Audio Signals"; 08/769,732 entitled "Method, System And Product For Using Encoded Audio Signals In A Speech Recognition System"; 08/772,591 entitled "Method, System And Product For Synthesizing Sound Using Encoded Audio Signals"; 08/769,731 entitled "Method, System And Product For Concatenation Of Sound And Voice Files Using Encoded Audio Data"; and 08/771,469 entitled "Graphic Interface System And Product For Editing Encoded Audio Data", all of which were filed on the same date and assigned to the same assignee as the present application.

TECHNICAL FIELD

This invention relates to a method, system and product for mixing encoded audio signals.

BACKGROUND ART

To more efficiently transmit digital audio data on low bandwidth data networks, or to store larger amounts of digital audio data in a small data space, various data compression or encoding systems and techniques have been developed. Many such encoded audio systems use as a main element in data reduction the concept of not transmitting, or otherwise not storing portions of the audio that might not be perceived by an end user. As a result, such systems are referred to as perceptually encoded or "lossy" audio systems.

However, as a result of such data elimination, perceptually encoded audio systems are not considered "audiophile" quality, and suffer from processing limitations. To overcome such deficiencies, a method and system have been developed to encode digital audio signals in a loss-less fashion, which is more properly referred to as "component audio" rather than perceptual encoding, since all portions or components of the digital audio signal are retained. Such a method and system are described in detail in U.S. patent application Ser. No. 08/771,790 entitled "Method And System For Lossless Encoding Of Digital Audio Data", which was filed on the same date and assigned to the same assignee as the present application, and is hereby incorporated by reference.

Well known processing techniques for linear encoded digital audio signals permit the mixing of music underneath a voice recording, or the mixing of many different musical instrument sounds in a multi-track recording system. While relatively simple, the computational power required for such processing is large.

However, perceptually encoded audio systems were designed for data packing and transmission purposes rather than for production purposes such as mixing. As a result, no such processing exists in the perceptual or component encoded signal path. Therefore, such audio must first be decoded to linear audio for mixing, and then re-encoded.

Thus, there exists a need for a method, system and product for mixing encoded audio signals directly, particularly perceptually encoded audio signals. The computations associated with such a method, system and product would be much less than mixing linear encoded full-range, full fidelity audio signals.

SUMMARY OF THE INVENTION

Accordingly, it is the principle object of the present invention to provide a method, system and product for mixing encoded audio signals, particularly perceptually encoded audio signals.

According to the present invention, then, a method is provided for mixing encoded audio signals. The method comprises receiving a first encoded audio signal, the first signal having a plurality of frequency subbands, each subband having an audio level, and receiving a second encoded audio signal, the second signal having a plurality of frequency subbands, each subband having an audio level. The method further comprises mixing the first and second signals to create a mixed encoded audio signal having a plurality of frequency subbands, each subband having an audio level based on a masking effect relationship between the audio levels and sample data of corresponding subbands of the first and second signals.

A system for mixing encoded audio signals is also provided. The system comprises a receiver for receiving a first encoded audio signal, the first signal having a plurality of frequency subbands, each subband having an audio level, and a receiver for receiving a second encoded audio signal, the second signal having a plurality of frequency subbands, each subband having an audio level. The system further comprises control logic operative to mix the first and second signals to create a mixed encoded audio signal having a plurality of frequency subbands, each subband having an audio level based on a masking effect relationship between the audio levels and sample data of corresponding subbands of the first and second signals.

An product for mixing encoded audio signals is also provided. The product comprises a storage medium having computer readable programmed instructions recorded thereon. The instructions are operative to mix a first encoded audio signal having a plurality of frequency subbands, each subband having an audio level, and a second encoded audio signal having a plurality of frequency subbands, each subband having an audio level, to create a mixed encoded audio signal having a plurality of frequency subbands, each subband having an audio level based on a masking effect relationship between the audio levels and sample data of corresponding subbands of the first and second signals.

These and other objects, features and advantages will be readily apparent upon consideration of the following detailed description in conjunction with the accompanying drawings.

BRIEF DESCRIPTION OF THE DRAWINGS

FIGS. 3a, 3b and 3c are exemplary graphic representations of encoded audio mixing according to the method, system and product of the present invention;

FIG. 4 is a Haas effect fusion zone curve for use with the method, system and product of the present invention;

FIG. 5 is a simplified block diagram of the system of the present invention; and FIG. 6 is an exemplary storage medium for use with the product of the present invention.

BEST MODE FOR CARRYING OUT THE INVENTION

In general, perceptually encoded audio data in either a datastream or in a fixed recorded asset has all audible characteristics separated into separate parametric data, such as thirty-two subband audio channels with associated data such as dynamic scale factor, non-existence of a subband channel, etc. This information is reconstructed at the receiving end in a synthesis filter bank which applies all of the parametric data to dynamically reconstruct the original data.

Significantly, this encoded information can be easily manipulated to mix many different encoded audio data signals to make one or more encoded audio data signals. The modifications of the audio parameters in a perceptually encoded audio datastream to perform such mixing are simpler and require much less computational power than convention mixing of linear audio.

In that regard, the present invention provides for such mixing of encoded audio signals, particularly perceptually encoded. In such a fashion, the present invention further provides efficient computation of large numbers of mixed signals with new functionalities of layering, spectral keying, and more. Moreover, equalization in such perceptually encoded mixing can, in many instances, be "non-destructive." In that regard, because the modifications are so easy to perform, such operations as frequency equalization can be performed at "mixdown" and the original files left alone.

Figure 1:
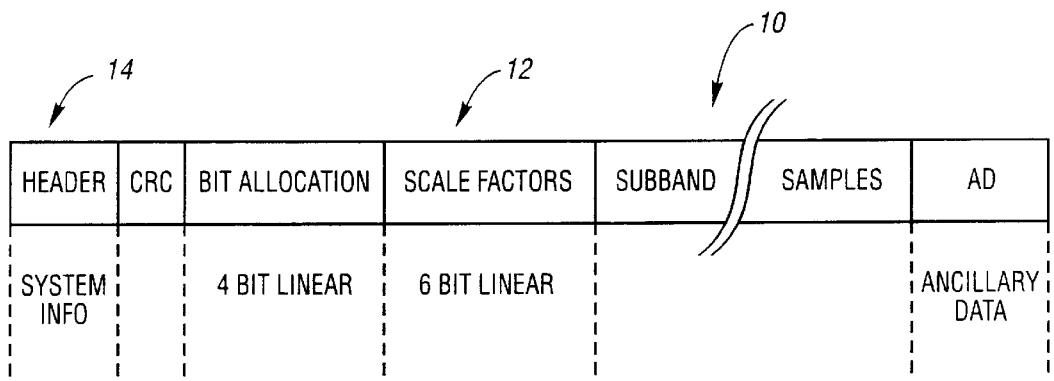
FIG. 1 is an exemplary encoding format for an audio frame according to prior art perceptually encoded audio systems.

Referring now to FIGS. 1–6, the preferred embodiments of the present invention will now be described more specifically. FIG. 1 depicts an exemplary encoding format for an audio frame according to prior art perceptually encoded audio systems, such as the various levels of the Motion Pictures Expert Group (MPEG), Musicam, or others. Examples of such systems are described in detail in a paper by K. Brandenburg et al. entitled "ISO-MPEG-1 Audio: A Generic Standard For Coding High-Quality Digital Audio", Audio Engineering Society, 92nd Convention, Vienna, Austria, March 1992, which is hereby incorporated by reference.

In that regard, it should be noted that the present invention can be applied to subband data encoded as either time versus amplitude (low bit resolution audio bands as in MPEG audio layers 1 or 2, and Musicam) or as frequency elements representing frequency, phase and amplitude data (resulting from Fourier transforms or inverse modified discrete cosine spectral analysis as in MPEG audio layer 3, Dolby AC3 and similar means of spectral analysis). It should further be noted that the present invention is suitable for use with any system using mono, stereo or multichannel sound including Dolby AC3, 5.1 and 7.1 channel systems.

As seen in FIG. 1, such perceptually encoded digital audio includes multiple frequency subband data samples (10), as well as 6 bit dynamic scale factors (12) (per subband) representing an available dynamic range of approximately 120 decibels (dB) given a resolution of 2 dB per scale factor. The bandwidth of each subband is ⅓ octave. Such perceptually encoded digital audio still further includes a header (14) having information pertaining to sync words and other system information such as data formats, audio frame sample rate, channels, etc.

To greatly increase the available dynamic range and/or the resolution thereof, one or more bits may be added to the dynamic scale factors (12). For example, by using 8 bit dynamic scale factors, the dynamic range is doubled to 256 dB and given an improved 1 dB per scale factor resolution. Alternatively, such 8 bit dynamic scale factors, with a given resolution of 0.5 dB per scale factor, will provide a dynamic range of 128 dB. In either case, the accuracy of storage is increased or maintained well beyond what is needed for dynamic range, while the side-effects of low resolution dynamic scaling are reduced.

Figure 2:
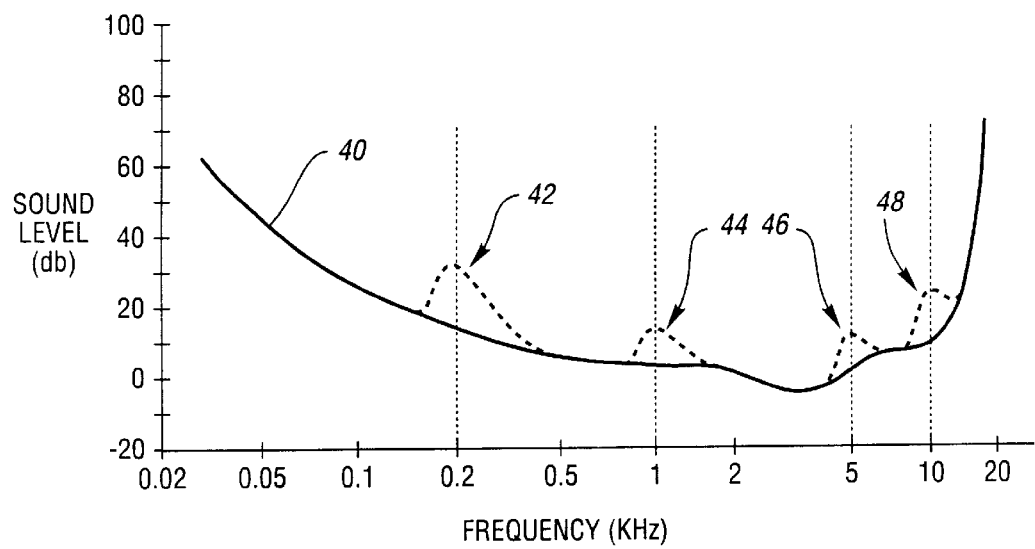
FIG. 2 is a psychoacoustic model of a human ear including exemplary masking effects for use with the method, system and product of the present invention.

As previously discussed, perceptually encoded audio systems eliminate portions of the audio that might not be perceived by an end user. This is accomplished using well known psychoacoustic modeling of the human ear. Referring now to FIG. 2, such a psychoacoustic model including exemplary masking effects is shown. As seen therein, at a given frequency (in kHz), sound levels (in dB) below the base line curve (40) are inaudible. Using this information, prior art perceptually encoded audio systems eliminate data samples in those frequency subbands where the sound level is likely inaudible.

As also seen therein, short band noise centered at various frequencies (42, 44, 46, 48) modifies the base line curve (40) to create what are known as masking effects. That is, such noise (42, 44, 46, 48) raises the level of sound required around such frequencies before that sound will be audible to the human ear. Using this information, prior art perceptually encoded audio systems further eliminate data samples in those frequency subbands where the sound level is likely inaudible due to such masking effects.

Alternatively, using a loss-less component audio encoding scheme, such masked audio may be retained. Once again, such a loss-less component audio encoding scheme is described in detail in U.S. patent application Ser. No. 08/771,790 entitled "Method, System And Product For Lossless Encoding Of Digital Audio Data", which was filed on the same date and assigned to the same assignee as the present application, and has been incorporated herein by reference.

In either case, if no information is present to be encoded into a subband, the subband does not need to be transmitted. Moreover, if the subband data is well below the level of audibility (not including masking effects), as shown by base line curve (40) of FIG. 2, the particular subband need not be encoded.

Referring now to FIG. 3, exemplary graphic representations of encoded audio mixing according to the present invention are shown. Such figures illustrate keying of audio signals wherein one signal is given priority (i.e., "foreground") over another signal or a group of signals (i.e., "background") such that the foreground signal would override any other signals being mixed therewith.

In the prior art, a standard type of mixing of linear audio signals might be referred to as "voice over." In that regard, if the foreground was voice and the background was music, the music would be turned down to an audio level less than that of the voice by some constant amount, and the signals would be added (i.e., mixed). As previously stated, while the computations associated with such mixing are relatively simple, they are numerous.

However, due to the masking effect discussed above with respect to FIG. 2, various portions of the voice may be inaudible even when the music has a reduced audio level.

Moreover, the full effect of the music may be lost at its reduced audio level.

Using perceptually encoded or component audio signals according to the present invention, the above standard mixing technique can also be performed. However, if there were any spectral elements in the music that would cover or mask the signals of the voice, then these elements of the music could be removed or not transmitted to the final mix. In such a fashion, the voice would be left fully audible over the music, or more accurately through the music, while a fuller effect of the music could be realized. The amount and size of spectral holes punched in the background for the foreground signal may be made user-adjustable.

In that regard, FIG. 3a is a graph of a foreground (e.g., voice) perceptually encoded audio signal (30) in the frequency domain. Similarly, FIG. 3b is a graph of a background (e.g., music) perceptually encoded audio signal (32) in the frequency domain. In that regard, each signal has a plurality of frequency subbands, each subband having its own amplitude or sound level. Finally, FIG. 3c is a similar spectral graph of a perceptually encoded audio signal resulting from the mixing of the signals of FIGS. 3a and 3b according to the present invention. As seen therein, foreground signal (30) has been given priority through the mixing process so that it is not masked by background signal (32).

Frequency equalization in such perceptually encoded mixing can, in many instances, be "non-destructive" in that the original signals are fully retained. Moreover, because the modifications are so easy to perform by means of adding or subtracting from the subband scale factor (audio level) data, such equalization can be performed at "mixdown", again with the original files left alone. The option of equalization of a file to such a point as data would be unrecoverably lost (such as removal of a subband) could be detected, and either the user notified or a safety limit placed on the data controls to keep the data in a safe mode. This is not available in normal linear audio signals.

Keying of different levels of foreground to background could be user-definable for different tacks of audio being mixed. In other words, if you are mixing 100 tracks of audio, you could have 100 levels of foreground to background priority. Indeed, those of ordinary skill in the art will recognize that any number or configuration of normal mixes bypassing or subject to foreground override after being mixed together, etc., are conceivable.

Additionally, conventional sound effects including echoes, delays, delay-generated effects such as flanging, chorusing, reverberation, sound doubling, etc. (i.e., any time delay generated effect), could all be generated in the perceptual encoded data at this point in the mixing domain. Phase shifting could also be simulated, as well as any known effect that is normally generated in the linear audio signal realm, using perceptually encoded data. As compared to normal linear audio file processing to achieve these effects, performing these effects in the perceptually encoded domain requires much less processing power and could be embedded into the mixing environment for great flexibility in configuration of processing. In that regard, such processing would preferably be dependent upon the well known Haas fusion effect (also referred to in the literature as temporal masking or pre-echo effect) depicted in FIG. 4, as well as psychoacoustic modeling previously described with respect to FIG. 2.

Referring now to FIG. 5, a simplified block diagram of the system of the present invention is shown. As seen therein, the system preferably comprises an appropriately programmed processor (50) for Digital Signal Processing (DSP). Processor (50) acts as a receiver for receiving first and second encoded audio signals (52, 54) (either or both of which may be stored sound files/assets) each having a plurality of frequency subbands, each subband having an audio level associated therewith. As previously described, encoded audio signals (52, 54) may be either perceptually encoded audio signals or component audio signals.

Once programmed, processor (50) provides control logic for performing various functions of the present invention. In that regard, the control logic of processor (50) is operative to mix the first and second signals (52, 54) to create a mixed encoded audio signal (56) having a plurality of frequency subbands, each subband having an audio level and sample data based on a masking effect relationship between the audio levels and sample data of corresponding subbands of the first and second signals (52, 54).

In that regard, to mix the first and second signals (52, 54), the control logic of processor (50) is operative to identify a subband of the second signal (54) having an audio level sufficient to mask the audio level of a corresponding subband of the first signal (52), and eliminating the identified subband from the second signal (54). Also to mix the first and second signals (52, 54), the control logic may be further operative to prioritize the audio levels of the subbands of the first signal (52) over the audio levels of the subbands of the second signal (54) throughout the plurality of subbands of the mixed signal (56).

As previously described, such mixing of the first and second signals (52, 54) by the control logic is preferably dependent upon a Haas fusion (i.e., temporal masking or pre-echo) effect relationship, as well as a psychoacoustic model. In that regard, the system of the present invention may further comprise an ear model (58), which is provided in communication with processor (50). Processor (50) uses ear model (58) to scale mixed encoded audio signal (56) to the characteristics of the human ear. In such a fashion, a common problem with prior art level compression schemes may be overcome, as discussed in U.S. patent application Ser. No.08/771,462 entitled "Method, System and Product For Modifying The Dynamic Range Of Encoded Audio Signals", which was filed on the same date and assigned to the same assignee as the present application, and which is hereby incorporated by reference.

As is readily apparent, mixed encoded audio signal (56) is similar to first and second encoded audio signals (52, 54). That is, if encoded audio signals (52, 54) are perceptual audio signals, then so is mixed encoded audio signal (56). Similarly, if encoded audio signals (52, 54) are component audio signals, then so is mixed encoded audio signal (56). After mixing of encoded audio signals (52, 54) is completed processor (50) then transmits mixed encoded audio signal (56).

The present invention is also dynamic in that it is based on user input. In that regard, processor (50) also receives control input (60) for keying differing levels of foreground to background as previously described, as well as for selecting any of the other effects described above.

To mix perceptually encoded audio signal (52, 54), the control logic of processor (50) would also be operative to perform the data reformatting and bit reallocating functions required for mixed encoded audio signal (56). In that regard, bits are reallocated toward the foreground signal first. If a decision concerning lower resolution is required, such lower resolution is given to the background signal. Of course, for component audio encoded as described generally above and more specifically in U.S. patent application Ser. No.08/771, 790 which was previously incorporated by reference, such operations need not be undertaken for the reasons set forth therein.

Referring finally to FIG. 6, an exemplary storage medium (100) for use with the product of the present invention is shown. In that regard, storage medium (100) is depicted as a conventional floppy disk, although any other type of storage medium may also be used.

Storage medium (100) has recorded thereon computer readable programmed instructions for performing various functions of the method of the present invention. More particularly, storage medium (100) includes programmed instructions operative to mix a first encoded audio signal having a plurality of frequency subbands, each subband having an audio level, and a second encoded audio signal having a plurality of frequency subbands, each subband having an audio level, to create a mixed encoded audio signal having a plurality of frequency subbands, each subband having an audio level based on a masking effect relationship between the audio levels of corresponding subbands of the first and second signals.

In that regard, to mix the first and second signals, the programmed instructions of storage medium (100) are operative to identify a subband of the second signal having an audio level sufficient to mask the audio level of a corresponding subband of the first signal, and eliminating the identified subband from the second signal. Also to mix the first and second signals, the programmed instructions are further operative to prioritize the audio levels of the subbands of the first signal over the audio levels of the subbands of the second signal throughout the plurality of subbands of the mixed signal. Once again, mixing of the first and second signals by the programmed instructions is preferably dependent upon a Haas fusion (i.e., temporal masking or pre-echo) effect relationship, as well as a psychoacoustic model.

It should be noted that the present invention is suitable for use in any type of DSP application including computer systems, hearing aids, transmission across networks including cellular, wireless and cable telephony, internet, cable television, satellites, audio/video post-production, etc. Indeed, any system that uses digitally encoded audio could benefit from the present invention which would allow a quantum improvement in processing power and quality for systems already deployed. In that regard, the method of the present invention could also be embodied in a software package such as the product previously discussed for post-production processing.

It should still further be noted that the present invention can be used in conjunction with the inventions disclosed in U.S. patent application Ser. Nos.08/771,790 entitled "Method, System And Product For Lossless Encoding Of Digital Audio Data"; 08/771,462 entitled "Method, System And Product For Modifying The Dynamic Range Of Encoded Audio Signals"; 08/771,792 entitled "Method, System And Product For Modifying Transmission And Playback Of Encoded Audio Data"; 08/771,512 entitled "Method, System And Product For Harmonic Enhancement Of Encoded Audio Signals"; 08/769,911 entitled "Method, System And Product For Multiband Compression Of Encoded Audio Signals"; 08/769,732 entitled "Method, System And Product For Using Encoded Audio Signals In A Speech Recognition System"; 08/772,591 entitled "Method, System And Product For Synthesizing Sound Using Encoded Audio Signals"; 08/769,731 entitled "Method, System And Product For Concatenation Of Sound And Voice Files Using Encoded Audio Data"; and 08/771,469 entitled "Graphic Interface System And Product For Editing Encoded Audio Data", all of which were filed on the same date and assigned to the same assignee as the present application, and which are hereby incorporated by reference.

As is readily apparent from the foregoing description, then, the present invention provides a method, system and product for mixing encoded audio signals, particularly perceptually encoded and component audio signals. The present invention provides for mixing of music underneath a voice recording automatically at a point of delivery such as at a cable head-end to custom fabricate commercial inserts, etc. The present invention still further provides for simultaneous mixing of many different musical instrument sounds in a multi-track recording system requiring a relatively small amount of storage space (disk, etc.), as well as for simultaneous mixing of numerous digital audio signals. In such a fashion, the present invention provides for a very powerful audio production system on a relatively small computer as compared to the amount of storage and computer power needed to perform the same task using standard linear encoded wideband digital audio signals.

It is to be understood that the present invention has been described above in an illustrative manner and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described herein.

What is claimed is:

1. A method for mixing encoded audio signal, the method comprising:

receiving a first encoded audio signal having a plurality of frequency subbands, each subband having an audio level;

receiving a second encoded audio signal having a plurality of frequency subbands, each subband having an audio level; and mixing the first and second signals to create a mixed encoded audio signal having a plurality of subbands, each subband having an audio level based on a masking effect relationship between the audio levels of corresponding subbands of the first and second signals, wherein mixing the first and second signals includes eliminating from the second signal a subband having an audio level sufficient to mask the audio level of a corresponding subband of the first signal, and performing frequency equalization, including generating a user notification signal if frequency equalization would result in destruction of a portion of the first or second encoded audio signal.

2. The method of claim 1 wherein mixed encoded audio signal includes a time delay generated effect.

3. The method of claim 1 wherein mixing the first and second signals includes prioritizing the audio levels of the subbands of the first signal over the audio levels of the subbands of the second signal throughout the plurality of the mixed signal.

4. The method of claim 1 wherein mixing the first and second signals is dependent upon a Haas fusion effect relationship.

5. The method of claim 1 wherein mixing the first and second signals is dependent upon a psychoacoustic model.

6. A system for mixing encoded audio signal, the system comprising:
- a receiver for receiving a first encoded audio signal having a plurality of frequency subbands, each subband having an audio level;
- a receiver for receiving a second encoded audio signal having a plurality of frequency subbands, each subband having an audio level; and
- control logic operative to mix the first and second signals to create a mixed encoded audio signal having a plurality of subbands, each subband having an audio level based on a masking effect relationship between the audio levels of corresponding subbands of the first and second signals, wherein to mix the first and second signals, the control logic is operative to eliminate from the second signal a subband having an audio level sufficient to mask the audio level of a corresponding subband of the first signal, and to perform frequency equalization, including generating a user notification signal if frequency equalization would result in destruction of a portion of the first or second encoded audio signal.

7. The system of claim 6 mixed encoded audio signal includes a time delay generated effect.

8. The system of claim 6 wherein, to mix the first and second signals, the control logic is further operative to prioritize the audio levels of the subbands of the first signal over the audio levels of the subbands of the second signal throughout the plurality of the mixed signal.

9. The system of claim 6 wherein mixing of the first and second signals by the control logic is dependent upon a Haas fusion effect relationship.

10. The system of claim 1 wherein mixing of the first and second signals by the control logic is dependent upon a psychoacoustic model.

11. A product for mixing encoded audio signal, the product comprising a storage medium having computer readable programmed instructions thereon, the instructions operative to mix a first encoded audio signal having a plurality of frequency subbands, each subband having an audio level, and a second encoded audio signal having a plurality of frequency subbands, each subband having an audio level, to create a mixed encoded audio signal having a plurality of subbands, each subband having an audio level based on a masking effect relationship between the audio levels of corresponding subbands of the first and second signals, wherein to mix the first and second signals, the programmed instructions are operative to eliminate from the second signal a subband having an audio level sufficient to mask the audio level of a corresponding subband of the first signal, and to perform frequency equalization, including generating a user notification signal if frequency equalization would result in destruction of a portion of the first or second encoded audio signal.

12. The product of claim 11 wherein mixed encoded audio signal includes a time delay generated effect.

13. The product of claim 11 wherein, to mix the first and second signals, the programmed instructions are further operative to prioritize the audio levels of the subbands of the first signal over the audio levels of the subbands of the second signal throughout the plurality of the mixed signal.

14. The product of claim 11 wherein mixing of the first and second signals by the programmed instructions is dependent upon a Haas fusion effect relationship.

15. The product of claim 11 wherein, mixing of the first and second signals, the programmed instructions independent unpon a psychoacoustic model.

* * * * *